(12) United States Patent
Odhner

(10) Patent No.: US 7,209,230 B2
(45) Date of Patent: Apr. 24, 2007

(54) HAND-HELD SPECTRA-REFLECTOMETER

(75) Inventor: Jefferson E. Odhner, Amherst, NH (US)

(73) Assignee: Luckoff Display Corporation, Columbus, OH (US)

( * ) Notice: Subject to any disclaimer, the term of this patent is extended or adjusted under 35 U.S.C. 154(b) by 86 days.

(21) Appl. No.: 11/156,419

(22) Filed: Jun. 20, 2005

(65) Prior Publication Data

US 2005/0280819 A1 Dec. 22, 2005

Related U.S. Application Data

(60) Provisional application No. 60/581,306, filed on Jun. 18, 2004.

(51) Int. Cl.
*G01J 3/28* (2006.01)
*G01J 3/06* (2006.01)

(52) U.S. Cl. ............ 356/328; 356/308; 356/334
(58) Field of Classification Search ......... 356/308, 356/328, 334
See application file for complete search history.

(56) References Cited

U.S. PATENT DOCUMENTS

| | | | | |
|---|---|---|---|---|
| 2,723,589 A * | 11/1955 | Bullock et al. | ............ | 356/308 |
| 3,572,933 A | 3/1971 | Boostrom | | |
| 3,578,866 A | 5/1971 | Kohler et al. | | |
| 3,625,615 A | 12/1971 | Wilson | | |
| 3,680,957 A | 8/1972 | Fukuda | | |
| 3,733,131 A | 5/1973 | Mould | | |
| 3,775,010 A | 11/1973 | Chupp et al. | | |
| 3,888,590 A | 6/1975 | White | | |
| 3,911,276 A | 10/1975 | Bell | | |
| 3,917,403 A | 11/1975 | Chupp et al. | | |
| 3,923,399 A | 12/1975 | Brumley | | |
| 4,025,196 A | 5/1977 | Chupp et al. | | |
| 4,043,670 A | 8/1977 | Kozlov et al. | | |
| 4,203,669 A | 5/1980 | Maeda et al. | | |
| 4,225,233 A * | 9/1980 | Ogan | .................. | 356/308 |
| 4,310,244 A | 1/1982 | Perkins et al. | | |
| 4,315,691 A | 2/1982 | Perkins et al. | | |
| 4,441,815 A | 4/1984 | Izumi | | |
| 4,469,441 A | 9/1984 | Bernier et al. | | |
| 4,553,253 A | 11/1985 | Petersen | | |
| 4,573,793 A | 3/1986 | Sasaki | | |
| 4,613,233 A | 9/1986 | Wilson | | |

(Continued)

FOREIGN PATENT DOCUMENTS

EP 506063 9/1992

(Continued)

*Primary Examiner*—F. L. Evans
(74) *Attorney, Agent, or Firm*—Mueller Smith & Matto

(57) ABSTRACT

The present invention is directed to apparatus and method for measuring the spectral characteristics of an object surface. The apparatus comprises a light source for generating an input signal comprising a plurality of wavelengths of energy and a diffraction grating for diffracting the input signal into a plurality of diffracted wavelengths of energy. A resonant mirror assembly associated with the diffraction grating sequentially directs a select diffracted wavelength to the object surface to generate a corresponding reflected wavelength of energy. The apparatus further comprises a sensor for determining each select diffracted wavelength of energy directed to the object surface and a detector for detecting one or more of the reflected wavelengths. The detector is coupled with the sensor for associating each select diffracted wavelength with each corresponding reflected wavelength.

16 Claims, 4 Drawing Sheets

U.S. PATENT DOCUMENTS

| | | | |
|---|---|---|---|
| 4,623,251 A | 11/1986 | Pouey | |
| 4,643,572 A | 2/1987 | Sonobe et al. | |
| 4,652,761 A | 3/1987 | Kerr et al. | |
| 4,697,924 A | 10/1987 | Akiyama | |
| 4,705,396 A | 11/1987 | Bergstrom | |
| 4,717,254 A | 1/1988 | Masuda | |
| 4,752,129 A * | 6/1988 | Izumi et al. | 356/328 |
| 4,752,130 A | 6/1988 | George et al. | |
| 4,776,696 A | 10/1988 | Hettrick et al. | |
| 4,830,493 A | 5/1989 | Giebeler | |
| 4,832,491 A | 5/1989 | Sharpe et al. | |
| 4,919,537 A | 4/1990 | Giebeler | |
| 4,921,350 A | 5/1990 | Giebeler | |
| 4,973,159 A | 11/1990 | Sohma et al. | |
| 4,995,724 A | 2/1991 | Sonobe et al. | |
| 5,078,495 A | 1/1992 | Harada et al. | |
| 5,080,486 A | 1/1992 | Shirasaki et al. | |
| 5,123,740 A | 6/1992 | Giebeler, Jr. | |
| 5,192,981 A | 3/1993 | Slutter et al. | |
| 5,223,913 A | 6/1993 | Ando et al. | |
| 5,231,462 A | 7/1993 | Dschen | |
| 5,233,405 A | 8/1993 | Wildnauer et al. | |
| 5,257,086 A | 10/1993 | Fateley et al. | |
| 5,285,254 A | 2/1994 | De Sa | |
| 5,359,409 A | 10/1994 | Wildnauer et al. | |
| 5,424,826 A | 6/1995 | Kinney | |
| 5,457,530 A | 10/1995 | Nagai | |
| 5,497,231 A * | 3/1996 | Schmidt | 356/334 |
| 5,504,575 A | 4/1996 | Stafford | |
| 5,528,364 A | 6/1996 | Koike | |
| 5,532,818 A | 7/1996 | Tokumoto | |
| 5,557,404 A | 9/1996 | Matsui et al. | |
| 5,570,180 A | 10/1996 | Nagai | |
| 5,631,735 A | 5/1997 | Nagai | |
| 5,657,121 A | 8/1997 | Nishina | |
| 5,689,334 A | 11/1997 | Atkinson et al. | |
| 5,710,627 A | 1/1998 | Inoue et al. | |
| 5,747,807 A | 5/1998 | Atkinson et al. | |
| 5,748,310 A | 5/1998 | Fujiyoshi | |
| 5,767,966 A | 6/1998 | Iwasaki | |
| 5,784,159 A | 7/1998 | Iwasaki | |
| 5,825,484 A | 10/1998 | Iwasaki | |
| 5,828,061 A | 10/1998 | Kakimoto | |
| 5,841,533 A | 11/1998 | Atkinson | |
| 5,844,681 A | 12/1998 | Alessi et al. | |
| 5,880,833 A | 3/1999 | Iwasaki | |
| 5,917,188 A | 6/1999 | Atkinson et al. | |
| 5,923,420 A | 7/1999 | Iwasaki | |
| 5,949,541 A | 9/1999 | Merle | |
| 6,038,024 A | 3/2000 | Berner | |
| 6,128,078 A | 10/2000 | Fateley | |
| 6,166,805 A | 12/2000 | Mori et al. | |
| 6,271,917 B1 | 8/2001 | Hagler | |
| 6,317,203 B1 | 11/2001 | Wakabayashi et al. | |
| 6,362,878 B1 | 3/2002 | Wang et al. | |
| 6,411,382 B1 | 6/2002 | Nishina | |
| 6,441,900 B1 | 8/2002 | Fujiyoshi | |
| 6,452,674 B1 | 9/2002 | Fujiyoshi | |
| 6,549,281 B2 | 4/2003 | Tokumoto | |
| 6,583,873 B1 | 6/2003 | Goncharov et al. | |
| 6,587,198 B2 | 7/2003 | Olshausen | |
| 6,597,452 B1 | 7/2003 | Jiang et al. | |
| 6,633,380 B1 | 10/2003 | Mori et al. | |
| 6,643,011 B2 | 11/2003 | Kojima | |
| 6,646,739 B2 | 11/2003 | Kaneko | |
| 6,657,724 B1 | 12/2003 | Dunstan et al. | |
| 6,678,044 B2 | 1/2004 | Kaneko | |
| 6,683,686 B2 | 1/2004 | Weigold et al. | |
| 6,710,330 B1 | 3/2004 | Tagami et al. | |
| 6,712,473 B2 | 3/2004 | Kurematsu | |
| 6,714,298 B2 | 3/2004 | Ryer | |
| 6,744,505 B1 | 6/2004 | Wang et al. | |
| 6,744,506 B2 | 6/2004 | Kaneko et al. | |
| 6,762,833 B2 | 7/2004 | Hagler | |
| 2001/0019408 A1 | 9/2001 | Hagler | |
| 2001/0019410 A1 | 9/2001 | Kojima | |
| 2001/0046047 A1 | 11/2001 | Ryer | |
| 2002/0001081 A1 | 1/2002 | Tokmoto | |
| 2002/0008873 A1 | 1/2002 | Kaneko | |
| 2002/0044280 A1 | 4/2002 | Weigold et al. | |
| 2002/0057431 A1 | 5/2002 | Fateley et al. | |
| 2002/0113962 A1 | 8/2002 | Kojima | |
| 2002/0126278 A1 | 9/2002 | Olshausen | |
| 2002/0186371 A1 | 12/2002 | Kaneko et al. | |
| 2003/0007148 A1 | 1/2003 | Moon et al. | |
| 2003/0011769 A1 | 1/2003 | Rakuljic et al. | |
| 2003/0016355 A1 | 1/2003 | Koike et al. | |
| 2003/0043373 A1 | 3/2003 | Russell | |
| 2003/0067601 A1 | 4/2003 | Asami et al. | |
| 2003/0081208 A1 | 5/2003 | Kaneko et al. | |
| 2003/0142308 A1 | 7/2003 | Koima et al. | |
| 2004/0036027 A1 | 2/2004 | Horton et al. | |
| 2004/0057049 A1 | 3/2004 | Bruch et al. | |

FOREIGN PATENT DOCUMENTS

| | | |
|---|---|---|
| JP | 5714539 | 9/1982 |
| JP | 58131522 | 8/1983 |
| JP | 59079124 | 5/1984 |
| JP | 59180440 | 10/1984 |
| JP | 60111125 | 6/1985 |
| JP | 60177227 | 9/1985 |
| JP | 60231123 | 11/1985 |
| JP | 62289737 | 12/1987 |
| JP | 63187125 | 8/1988 |
| JP | 01314927 | 12/1989 |
| JP | 2231536 | 9/1990 |
| JP | 4015529 | 1/1992 |
| JP | 4190123 | 7/1992 |
| JP | 6011391 | 1/1994 |

* cited by examiner

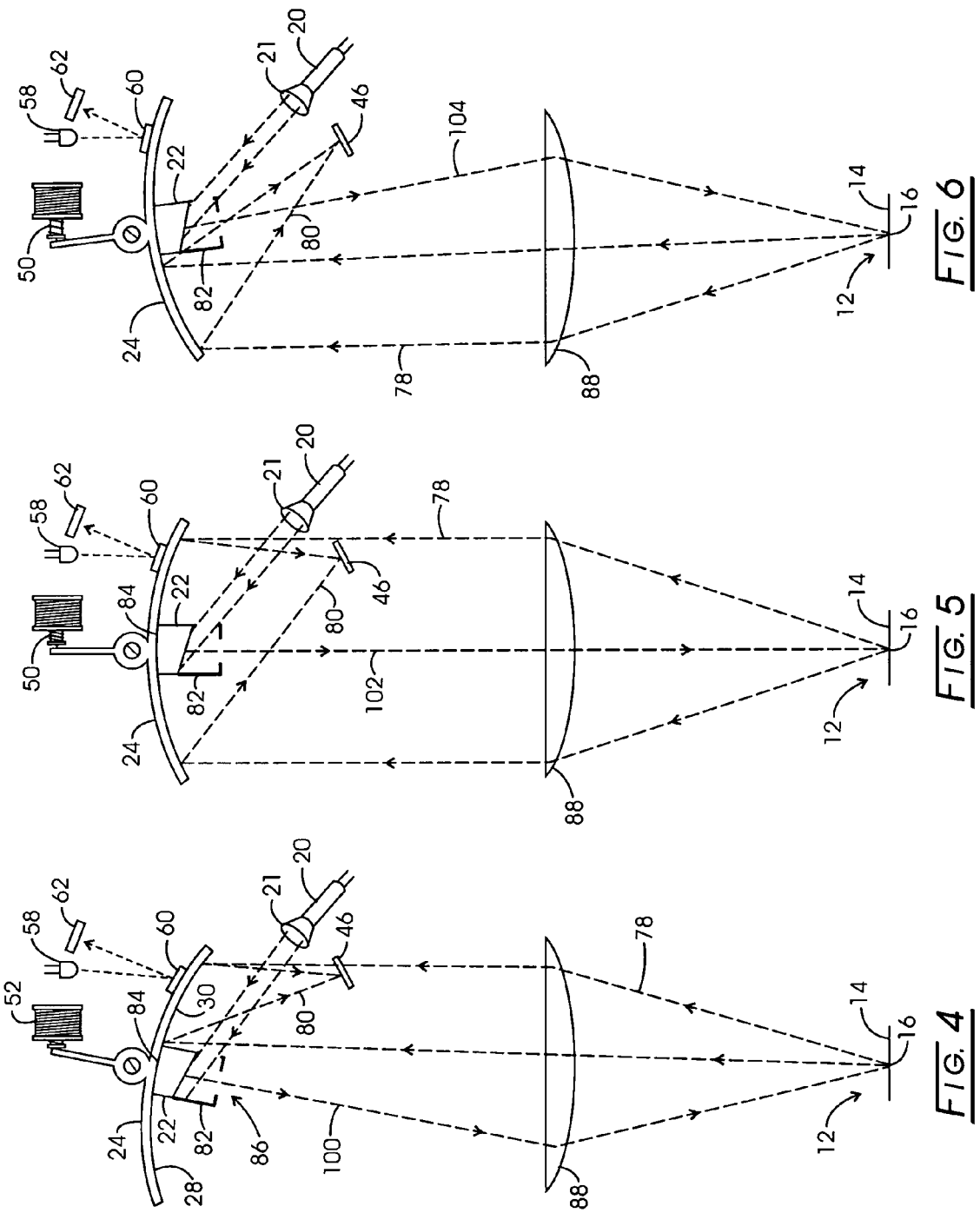

HAND-HELD SPECTRA-REFLECTOMETER

CROSS-REFERENCE TO RELATED APPLICATIONS

This application claims the benefit of provisional Application No. 60/581,306, filed Jun. 18, 2004, the disclosure of which is hereby incorporated by reference.

STATEMENT REGARDING FEDERALLY SPONSORED RESEARCH

Not applicable.

BACKGROUND OF THE INVENTION

Devices currently exist for conducting spectral analysis. One such device is the monochromator. As described in U.S. Pat. No. 3,888,590, a monochromator includes an entrance slit for admitting light from a source, a collimator such as a mirror, a diffraction grating or other dispersing element and a telescope mirror for forming a substantially monochromatic image of the entrance slit. Light entering the entrance slit is reflected by the collimator, is dispersed into a spectrum by the dispersing element, and is reformed into the dispersed image by the telescope so that by positioning a receiving element such as an exit slit relative to the dispersed element, a selected portion of the spectrum is obtained. In these devices, the dispersing element customarily is movable relative to the other optical components in order to change the angle of the light and thereby produce dispersed images of different portions of the spectrum. It also should be noted that components of these devices are configured such that the light path is generally M-shaped. One of the disadvantages of these devices is that relatively complex and/or expensive mechanisms are required for movement of the diffractive element.

Another optical device for reproducing portions of the spectrum utilizes multiple monochromatic light sources, each of a different wavelength. A disadvantage of this approach is that each light source must be calibrated to ensure that the light output has the wavelength desired. The device also is relatively expensive.

Another disadvantage of certain optical devices is the use of a linear CCD, which incorporates a plurality of detectors, each of which detects energy of a particular wavelength. While such a component provides an efficient solution for simultaneously detecting a plurality of energy signals, its cost is much greater than that of a detector that can detect only a single signal at any given time.

BRIEF SUMMARY OF THE INVENTION

The present invention is directed to an improved spectra-reflectometer and method for measuring the spectral characteristics of an object surface. The spectra-reflectometer comprises a light source for generating an input signal comprising a plurality of wavelengths of energy and a diffraction grating for diffracting the input signal into a plurality of diffracted wavelengths of energy. A resonant mirror assembly associated with the diffraction grating sequentially directs a select diffracted wavelength to the object surface to generate a corresponding reflected wavelength of energy. The apparatus further comprises a sensor for determining each select diffracted wavelength of energy directed to the object surface and a detector for detecting one or more of the reflected wavelengths. The detector is coupled with the sensor for associating each select diffracted wavelength with each corresponding reflected wavelength.

A fixed or moving stop may be incorporated in the spectra-reflectometer as one approach for selecting the particular wavelength of energy directed to the object surface.

The method of the invention comprises, first, energizing a light source to generate an input signal comprising a plurality of wavelengths of energy. That input signal then is directed to a diffraction grating which diffracts the input signal into a plurality of diffracted wavelengths of energy. A resonant mirror assembly associated with the diffraction grating is actuated to sequentially direct a select diffracted wavelength to the object surface to generate a corresponding reflected wavelength of energy. A sensor is actuated to determine each select diffracted wavelength of energy directed to said object surface. By actuating a detector, one or more of the reflected wavelengths may be detected.

BRIEF DESCRIPTION OF THE DRAWINGS

For a fuller understanding of the nature and advantages of the present invention, reference should be had to the following detailed description taken in connection with the accompanying drawings, in which:

FIG. 4 is a simplified, overhead view of another embodiment of the apparatus of the invention including a moving stop and illustrating the mirror in a first position;

FIG. 5 is an overhead view of the embodiment shown in FIG. 4 illustrating the mirror in a second position;

FIG. 6 is an overhead view of the embodiment shown in FIG. 4 illustrating the mirror in a third position;

DETAILED DESCRIPTION OF THE INVENTION

The present invention is directed to a hand-held spectra-reflectometer and method for determining the optical characteristics of an object surface based on measurements of the intensity or amplitude of energy(s) reflected from the object surface. The optical characteristics to be determined include, for example, reflectivity, transmissivity, or absorbability.

Knowing the optical characteristics of an object surface is advantageous for any number of practical applications. For example, a user may desire to know the color of items such as paint, fabric, glass, hair coloring, etc. For color matching applications, the object may be a painted wall, a piece of furniture, a rug, a set of drapes, an article of clothing, a glass window, a painted automobile fender, hair, etc. Because the reflectivity of a plant leaf is indicative of the health of the plant, the object also may be a plant leaf. The spectra-reflectometer may be used in a factory for quality control of inventory. For example, the apparatus may be used to compare the "whiteness" of newspaper.

The optical characteristic of interest for the examples cited above is reflectivity. The spectra-reflectometer of the present invention also can be used to determine transmissivity. For example, the object may be an optical filter whose bandwidth is to be determined. Looking at an output of amplitude of reflected energies versus wavelength, a user can surmise that when the amplitude at a particular wavelength is zero, the filter passed that wavelength. Thus, the output informs the user as to which wavelengths were transmitted or filtered and which wavelengths were not.

Figure 1:
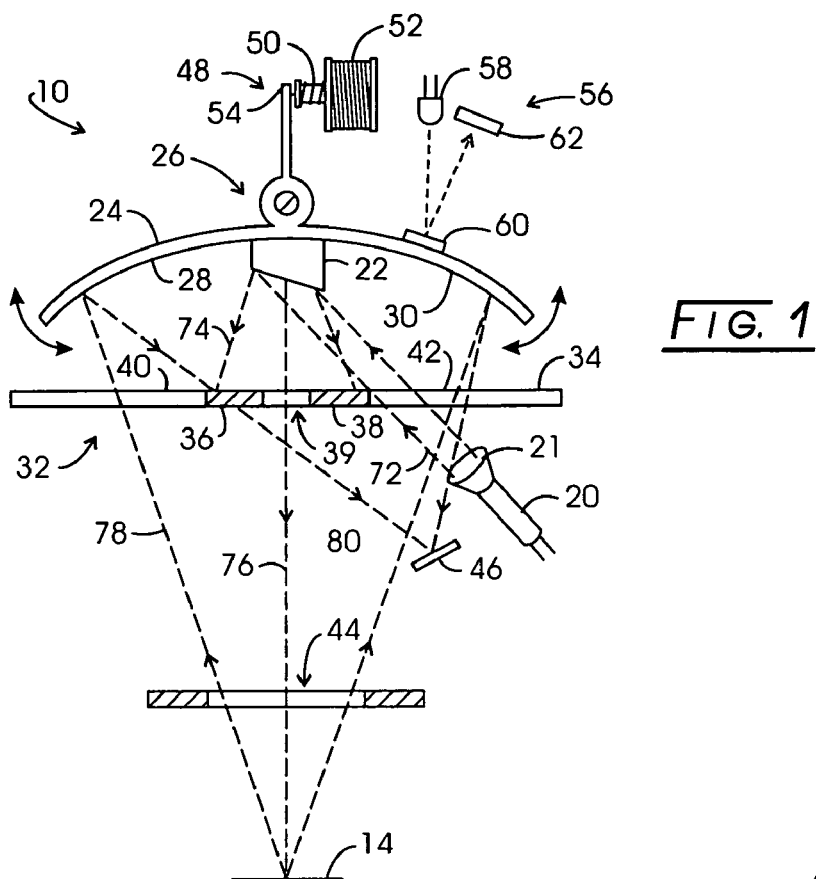
FIG. 1 is a simplified, overhead schematic of the components comprising one embodiment of the apparatus of the present invention and an object surface.
Figure 2:
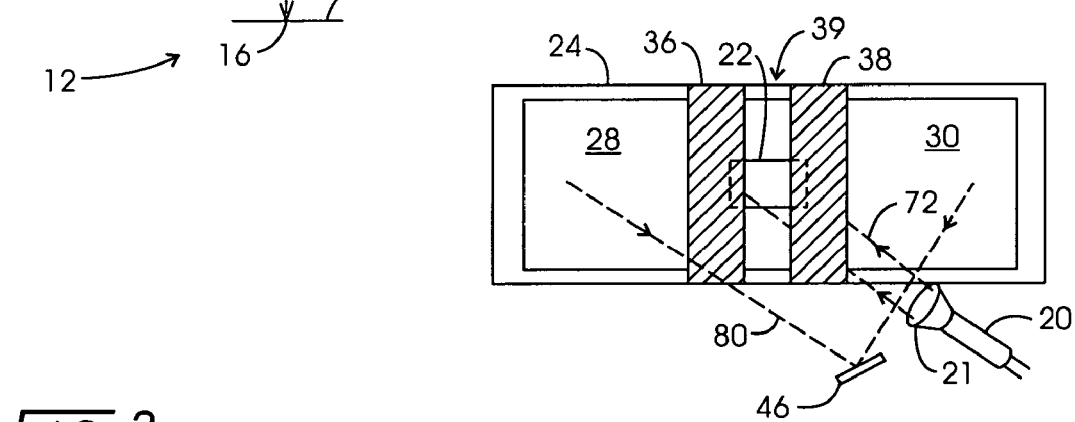
FIG. 2 is a sectional view taken along the line 2—2 in FIG. 1.
Figure 3:
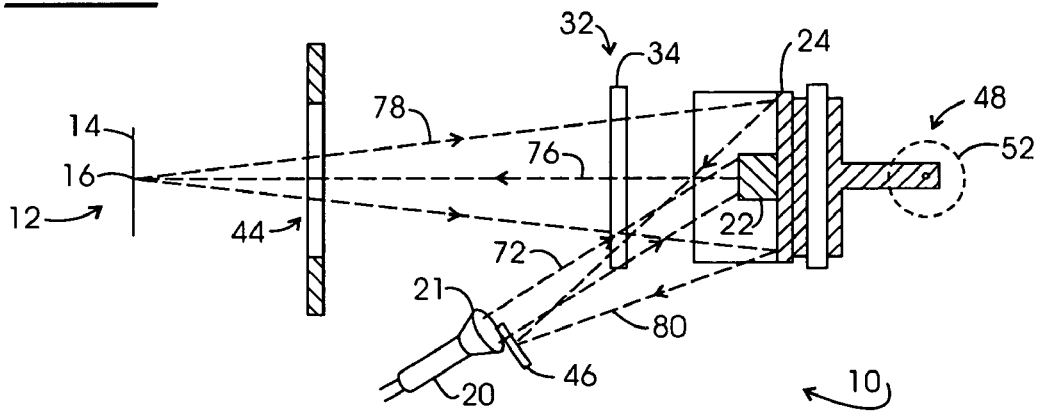
FIG. 3 is a side view of the embodiment of FIG. 1 showing the spectra-reflectometer and object surface.

FIGS. 1–3 illustrate one embodiment of a spectra-reflectometer, 10, for measuring the optical characteristics of an object surface. For convenience, spectra-reflectometer 10 preferably is hand-held and portable, as shown in FIG. 1, so that measurements can easily be taken by the user. For particular applications, however, it may be advantageous for the apparatus to be maintained at a fixed location.

Spectra-reflectometer 10 is shown positioned adjacent an object, 12, which as noted above may be any object whose optical characteristics the user desires to measure. Object 12 has a surface, 14, on which a point or target, 16, is chosen. Using spectra-reflectometer 10, a reading will be taken of the optical characteristics of the object surface at point 16. The user also may take multiple readings at the same or various points of surface 14 to ensure that the optical readings are constant. Alternatively, the user may take various readings along surface 14 to establish an average or overall measurement of the object's optical characteristics.

Spectra-reflectometer 10 includes a housing, 18 (FIG. 7), which encloses the inner components of the apparatus. Housing 18 may have dimensions, for example, of about 102 mm by about 52 mm by about 22 mm. Within housing 18 is a light source, 20, including of multiple wavelengths of energy. Light source 20 preferably is a broadband light source composed of a plurality of one or more of visible, ultra-violet, or infrared wavelengths of energy. A collimator, 21, is provided for collimating light source 20. For certain applications, light source 20 may not be energized. In that case, the reflectivity of ambient light can be measured. Also contained within housing 18 is a resonant mirror assembly including a reflective surface, 24, having a central portion, 26, and reflective portions, 28 and 30. Central portion 26 bears a diffraction grating, 22.

As used herein, a resonant mirror assembly means an assembly including a mirror which is mounted on a flexure or pivot that brings the mirror back to a nominal position, but which oscillates when a sinusoidal voltage is applied to a magnet that is attached to the flexure. The frequency of the oscillation is dependent on the combined mass of the mirror, magnet, and flexure. When the proper sine wave frequency is applied to the mirror, it can operate at its resonant frequency and takes very little power to sustain this condition. In this embodiment, for example, the resonant mirror assembly includes an actuator assembly shown generally at 48 is provided to effect movement of mirror 24 and diffraction grating 22. As shown in FIG. 1, the mirror may be a toroidal mirror. Actuator assembly 48 is seen to include a magnet, 50, which is attached to mirror 24 and a coil, 52. When an oscillating current is applied to coil 52, magnet 50 moves proportionally to the changes in applied current. Movement of magnet 50, in turn, effects movement of the mirror 24 to which magnet 50 is affixed. Thus, when coil 52 is energized, mirror 24 will oscillate about a pivot point, such as that shown at 54. One such resonant mirror assembly is sold under the trade name Symbol Technology LS 4008i Scanner including Mylar Motor Assembly (Part No. 21-60774-02), which is manufactured by Symbol Technologies, Inc. of Long Island, NY. Such resonant mirror assemblies are known for use in bar code scanning applications and currently can be purchased off-the-shelf for about US $7.00 to about US $22.00. Any drive mechanism for oscillating mirror 24 may be used (e.g., linear actuator, stepper motor, etc.); however, a magnet/coil assembly such as that shown minimizes the energy input to achieve the desired oscillation. Because diffraction grating 22 is affixed to mirror 24, movement of mirror 24 also moves diffraction grating 22.

For illustrative purposes, the reflective surface shown in the embodiment depicted in FIG. 1 is a mirror to which a diffraction grating is affixed. Other reflective surfaces other than a mirror may be used. Also, the reflective surface and diffraction grating may be a single component or may include multiple components. For example, in its simplest embodiment, the diffraction grating may simply be etched into a portion of the reflective surface. Alternatively, the diffraction grating may be transmissive and the reflective surface spaced apart from the diffraction grating.

Diffraction grating 22 diffracts energy from light source 20 into its spectral components. Diffraction grating 22 may be any conventional diffraction grating, such as an etched grating or a holographic diffraction grating. Regardless of the form of the diffraction grating, the lines of the grating are parallel to the axis of mirror 24's rotation or oscillation. Diffraction grating 20's spacing will determine the angular dispersion of the resulting spectrum. A signal detector, 46, is positioned to detect signals reflected from target 16 and from mirror reflecting portions 28 and 30.

Figure 7:
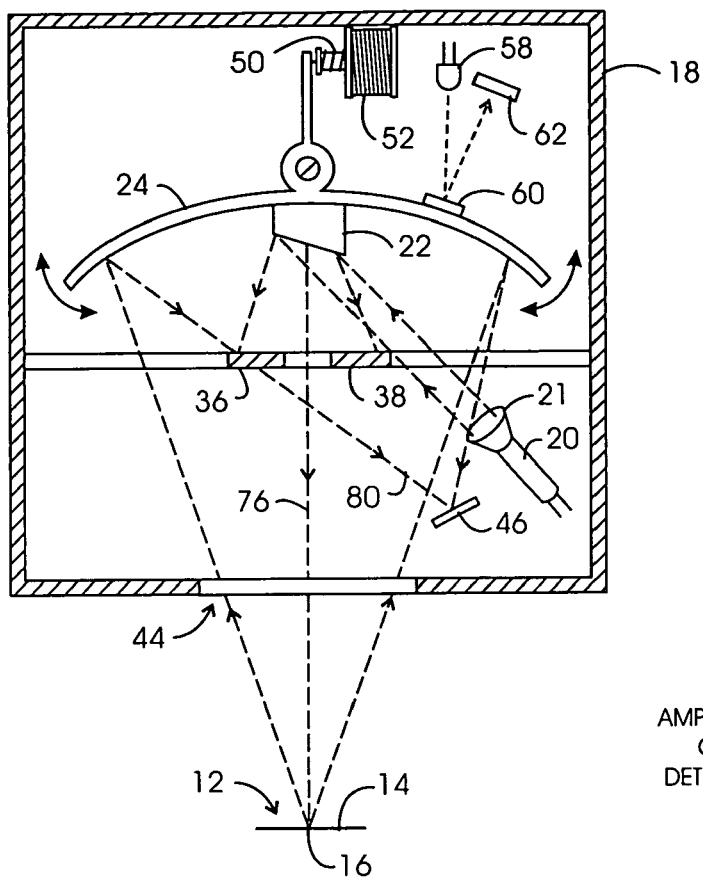
FIG. 7 is an overhead view of the embodiment of FIG. 1 including a housing.

An optical stop assembly is shown generally at 32. The optical stop assembly blocks all but a portion of the diffracted spectral band to pass to target 16. The portion of the spectral band that passes through the optical stop is centered on an exit aperture, 44, which extends through housing 18 (FIG. 7). Throughout this application, that portion of the spectrum is generally referred to as a wavelength of a particular energy; however, it will be understand that the signal passing through the optical stop may be a range of wavelengths. In this embodiment, optical stop assembly 32 includes an optical stop having a pair of beam blocks, 36 and 38. Extending between beam blocks 36 and 38 is a slit, 39. Adjacent beam blocks 36 and 38 include clear or transparent areas, 40 and 42. This optical stop generally is referred to as a "fixed" optical stop. A fixed optical stop, advantageously does not require an achromatic cylindrical lens to focus the energy on a single point, i.e., target 16. In this embodiment, however, stray light reflected from the back of the stop may decrease the signal to noise ratio detected at 46. Another optical stop assembly configuration embodiment utilizing a "moving" stop is illustrated in FIG. 4 and described in connection with that figure.

Spectra-reflectometer 10 also includes a position detector assembly for detecting the position of the diffraction grating at a given time. An illustrative position detector assembly is shown generally at 56. Assembly 56 is seen to include a light emitting diode (LED), 58, a diffuse reflector, 60, and a detector, 62. LED 58 emits a constant light energy onto diffuse reflector 60. Photo-detector 62 receives the reflected light from diffuse reflector 60. As the angular position of mirror 24, and thus diffraction grating 22, changes, the signal on detector 62 changes proportionally. This signal is recorded. The amplitude of the signal will indicate the position of the mirror. If the reflector 60 is biased at a slight angle, as shown in FIG. 1, then the signal received by the detector also will be indicative of whether the mirror is angled to the right or left of center. See FIGS. 4–6, discussed below.

In use, the user identifies target 16 on object surface 14. Spectra-reflectometer 10 is positioned with exit aperture 44 in proximity and substantially normal to surface 14 as shown in FIG. 1. When positioned substantially normal to surface 14, the maximum reflected signal from the target will be received by the spectra-reflectometer. Spectra-reflectometer 10 may be positioned at an angle away from normal, however, such movement will affect the sensitivity of the device. The same is true with respect to the proximity of the spectra-reflectometer the object surface. The closer the spectra-reflectometer is to the surface, the stronger will be the reflected signal from the target.

Light source 20 is energized and collimated beam, 72, directed on to the surface of grating 22. Beam 72 is diffracted into multiple wavelengths of light as at 74. A particular wavelength is selected or passed through slit 39 of optical stop assembly 32 as indicated at 76. Selected wavelength 76 passes through exit aperture 44 and is incident on target 16. Light or energy reflected from target 16 returns through exit aperture 44 toward mirror 24 as indicated at 78. Mirror reflective portions 28 and 30 direct the reflected energy to signal detector 46 as at 80. Detector 46 generates a signal proportional to the intensity of the energy detected and that signal is transmitted to the recorder. The position of the mirror, which correlates to the wavelength of light passed, also is transmitted to the recorder via detector 62. As mirror 24 rotates to another position via actuator assembly 32, a different wavelength of light is passed through slit 39. The oscillating movement of the mirror, thus, results in a scanning of the spectrum of diffracted wavelengths across the target. Intensities of the reflected light from each wavelength are recorded and the output displayed to the user.

FIGS. 4–6 show the apparatus of FIGS. 1–3 with a moving stop, 82, substituted for fixed stop of optical stop assembly 32. Components previously identified in FIGS. 1–3 retain their earlier numeration. With the fixed stop of FIGS. 1–3, beam blocks 36 and 38 must be wide enough so that all of the diffracted energy, 74, is blocked over the entire mirror scan excursion, except for selected energy 76 passing through slit 39. In the embodiment shown in FIG. 4, a moving stop, 82, in the form of a opaque box is positioned in front of and fixed to diffraction grating 22. Moving stop 82 includes a hole, 84, in the side adjacent diffraction grating 22 and a slit, 86, on the oppositely disposed side. All of the light diffracted from diffraction grating 22 is collected by opaque box 82 through hole, 84. Only energy of a particular wavelength will pass through slit 86 on the opposite side of the opaque box. As the angle of the diffraction grating with respect to the light source changes, the particular wavelength passing through slit 86 will change. In this embodiment, the light passing through slit 86 is collected by an achromatic cylindrical lens, 88, which focuses that diffracted light onto a single point. This is necessary so that the chosen diffracted wavelength will be directed through exit aperture 44 to target 16.

For both the fixed stop and moving stop embodiments, the slits are shown as being passive. That means that the width of the slit is predetermined and unchangeable. For either embodiment, however, the passive slit may be replaced with an active slit. For example, for the embodiment shown in FIGS. 1–3, the stop may be a liquid crystal display with an electronically adjustable slit width determined by the signal sent to the liquid crystal plate of the display. The signal would be such that the liquid crystal plate is opaque with the exception of a clear line whose width is electronically controlled. An active slit also could be used with the moving stop of FIG. 4 by replacing the slitted side of the opaque box with a liquid crystal display.

Regardless of whether it is an active or passive slit, a relatively narrow slit passes a correspondingly narrow spectral bandwidth which means less energy on the detector and a lower signal to noise ratio. A relatively wider slit provides a higher signal to noise ratio due to the increased energy on the detector; however, the wider the slit the lower the spectral resolution of the spectra-reflectometer. The spectra-reflectometer may have a resolution of about 1 nm to about 2 nm.

Figure 8:
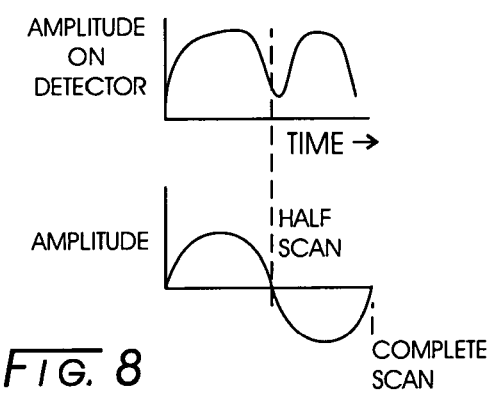
FIG. 8 is a graphic illustration of the output of the position detector assembly of the invention.

FIGS. 4–6 also show the movement of mirror 24 to direct different wavelengths of energy to the object surface. The number of positions and angles of rotation of the mirror are intended to be illustrative only and not limiting of the invention. In a first position, shown in FIG. 4, mirror 24 is rotated so that diffraction grating 22 is angled to the left of center. At this position, the diffracted spectrum of light is shifted to the left and the wavelength of light, 100, directed through slit 86 may be, for example, blue. That wavelength of energy is directed onto target 16 and reflected energy is directed from reflecting portion 30 onto detector 46. The intensity or amplitude of the reflected light from the target is transmitted from detector 46 to a recorder for storage and output to the user. Recorders for storing and displaying data are well-known to the skilled artisan, such as, for example, registers, optical storage (e.g., CD ROMs, DVDs), bubble memory storage, and the like. Any conventional device that includes or functions as a recorder may be used. For example, the intensity and wavelength may be transmitted to a microprocessor. The position of mirror 24 is detected by position detector assembly 56 as described in connection with FIG. 1. This information also is transmitted to the recorder. Because the position of the mirror corresponds to the wavelength of light transmitted, the information stored in the recorder represent the intensity of reflected light at the above-noted wavelength of energy, i.e., blue. Looking momentarily to FIG. 8, the change in amplitude of light detected by photo-detector 60 over time is graphically illustrated. The graph below represents the change in amplitude of detected light over a single scan of mirror 24.

In a second position, as in FIG. 5, mirror 24 is in a center position. Because it is fixed to mirror 24, diffraction grating 22 also is in a center position and a different wavelength of energy, 102, is directed to target 16. This wavelength, for example, may be that associated with the color green. Reflected light from target 16 is directed to mirror reflecting portions 28 and 30 and then to detector 46. The intensity of the signal and mirror position are again transmitted to the recorder and stored in memory.

Finally, in a third position (FIG. 6), mirror 24 and diffraction grating 22 are rotated to the right of center, presenting yet a third wavelength of light to target 16. This wavelength may be, for example, that associated with the color red. The reflected light from the target and mirror position again are detected, and this information again is stored in memory.

Figure 9:
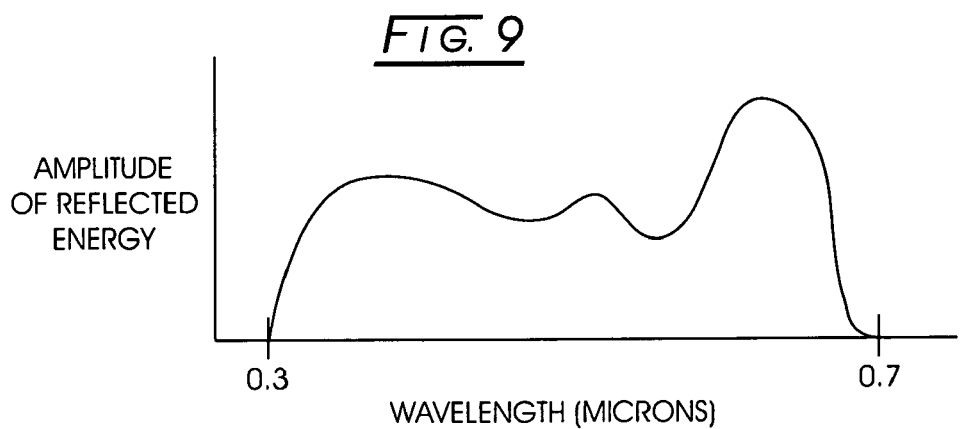
FIG. 9 is a graphic representation of the output of the apparatus of the invention showing amplitude of reflected energy versus wavelength.

A graphical representation of one illustrative spectra-reflectometer output is shown in FIG. 9. That output is a graph of the amplitude or intensity of reflected energy from the target as a function of wavelength. The output may be presented to the user in any other format desired, e.g., a table, a graph, or the like.

Once the amplitude versus wavelength data has been generated, it may be used in any of the applications described above. If the spectra-reflectometer is being used in a color matching application, then the reflectivity of the target can be compared to the reflectivity of other samples to find a match. For example, a paint store may use the spectra-reflectometer to measure the reflectivities of its paints. Those measurements then are stored in memory and later compared to the reflectivity of the target to find a match. What constitutes a "match" will depend on the application and can be defined by the user. In a color matching application, if a paint sample's amplitudes of energy at certain wavelengths are no greater or less than, say, for example, 10% of the target's amplitudes at those same wavelengths, then that paint sample would be considered a match.

Figure 10:
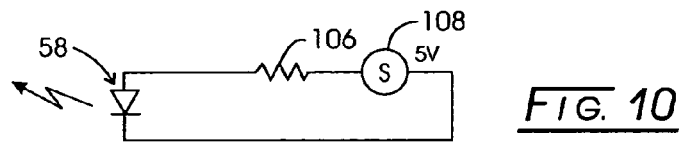
FIG. 10 is an electrical schematic representation of the light emitting diode portion of the position detector assembly of FIG. 1.
Figure 11:
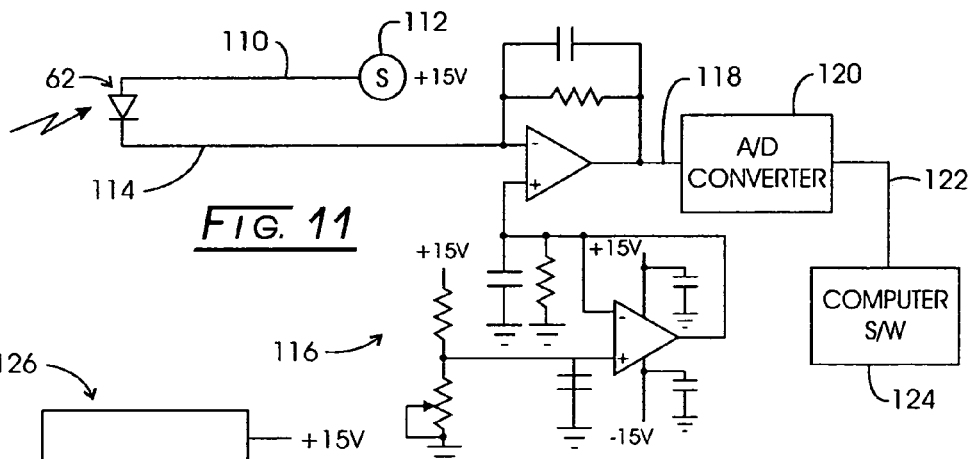
FIG. 11 is an electrical schematic representation of the photo-detector portion of the position detector assembly of FIG. 1.
Figure 12:
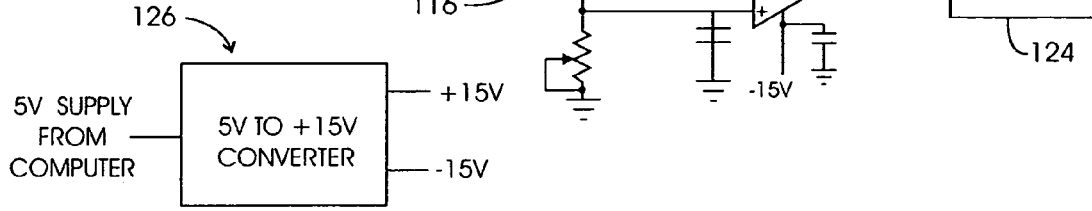
FIG. 12 is an electrical schematic representation of a power converter.

FIGS. 10–12 are schematic representations of certain electrical circuitry comprising the invention. FIGS. 10 and 11 together comprise position detector assembly 56. FIG. 10 illustrates the connection of LED 58 via a resistor, 106, to a 5 Volt source, 108. FIG. 11 illustrates the connection of photo-detector 62 to a 15 Volt source, 112, via line 110 and an variable gain amplifier, 116, via line 114. The detected signal is transmitted via line 118 to an analog to digital converter represented at block 120. That signal then is transmitted via line 122 to a microprocessor as represented at block 124. A power converter is provided as shown at 126.

Figure 13:
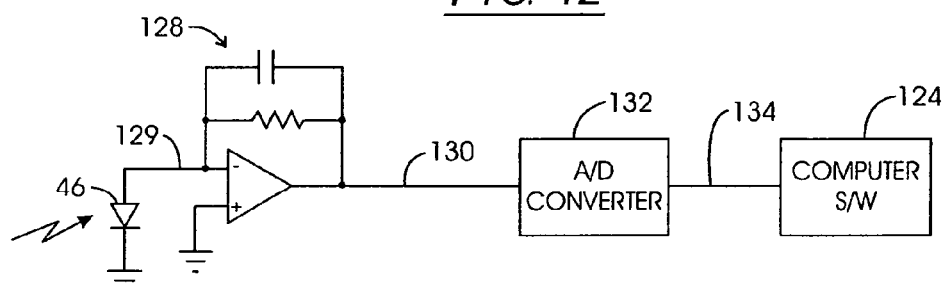
FIG. 13 is an electrical schematic representation of the reflected energy detector of FIG. 1.

Circuitry for detector 46 is represented in FIG. 13. Detector 46 is connected via line 129 to amplifier 128. The amplified signal is transmitted via line 130 to an analog to digital converter and then transmitted via line 134 to the microprocessor represented at block 124.

Figure 14:
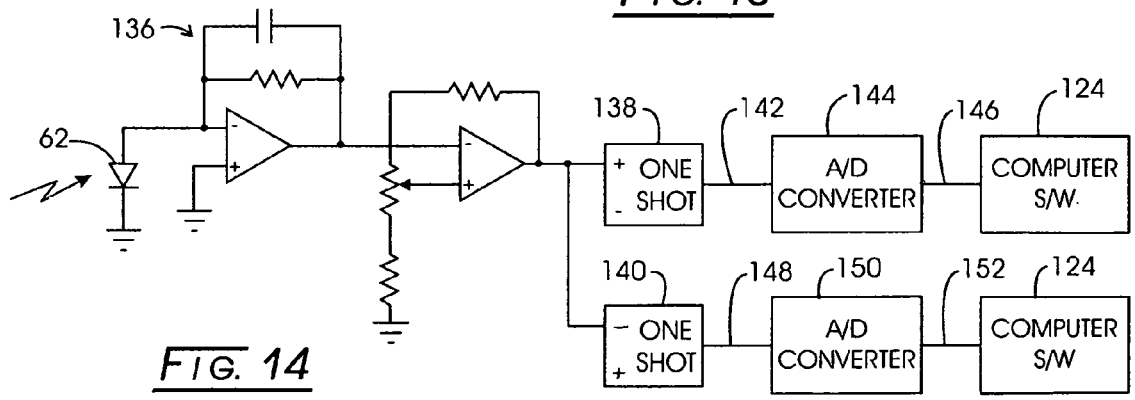
FIG. 14 an electrical schematic representation of circuitry to identify when a scan cycle begins and ends.

In FIG. 14, circuitry is provided to detect the beginning and ending of a scan cycle. A signal from detector 62 is amplified as at 136. The resulting signal is directed to monostable multivibrators 138 and 140. A change of state at multivibrator 138 indicates the beginning of a scan cycle. The resulting signal generated at 138 is directed via line 142 to analog digital converter 144 and then to microprocessor 124 via line 146. A change of state at monostable multivibrator 140 indicates the end of a scan cycle. The resulting signal generated at 140 is directed via line 148 to analog to digital converter 150 and then to microprocessor 124 via line 152.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

I claim:

1. A spectra-reflectometer for measuring the spectral characteristics of an object surface, comprising:
    (a) a light source for generating an input signal comprising a plurality of wavelengths of energy;
    (b) a diffraction grating for diffracting said input signal into a plurality of diffracted wavelengths of energy;
    (c) an optical stop positioned between said diffraction grating and said object surface for selectively passing a select wavelength of energy from among said plurality of diffracted wavelengths of energy to said object surface to generate a corresponding reflected wavelength of energy:
    (d) a resonant mirror assembly associated with said diffraction grating for moving said diffraction grating to sequentially direct said plurality of diffracted wavelengths of energy to said optical stop;
    (e) a sensor for determining each select diffracted wavelength of energy directed to said object surface;
    (f) a detector for detecting one or more of said reflected wavelengths, said detector being coupled with said sensor for associating each said select diffracted wavelength with each said corresponding reflected wavelength and
    (g) said resonant mirror assembly being capable of directing said reflected wavelength of energy to said detector.

2. The spectra-reflectometer of claim 1, wherein said spectral characteristics comprise one or more of reflectivity, transmissivity, or absorbability.

3. The spectra-reflectometer of claim 1, wherein:
    said resonant mirror assembly includes a reflective surface and a back surface; and
    said diffractive grating is affixed to said reflective surface.

4. The spectra-reflectometer of claim 1, further comprising:
    a collimating lens spaced apart from said resonant mirror assembly and positioned to direct said plurality of wavelengths from said light source to said diffraction grating; and said diffraction grating being spaced apart from said resonant mirror assembly.

5. The spectra-reflectometer of claim 1 wherein said optical stop is a fixed optical stop.

6. The spectra-reflectometer of claim 5 wherein said optical stop is a moving optical stop.

7. The spectra-reflectometer of claim 1 having a resolution of about 1 nm to about 2 nm.

8. The spectra-reflectometer of claim 1 wherein said resonant mirror assembly comprises a toroidal mirror having a pivot point and a drive assembly for moving said toroidal mirror about said pivot point.

9. The spectra-reflectometer of claim 1, further comprising a housing having dimensions of 102 mm by about 52 mm by about 22 mm.

10. A method for measuring the spectral characteristics of an object surface, comprising the steps of:
    (a) energizing a light source to generate an input signal comprising a plurality of wavelengths of energy;
    (b) directing said input signal to a diffraction grating to diffract said input signal into a plurality of diffracted wavelengths of energy;

(c) Droviding an oDtical stop positioned between said diffraction grating and said object surface for passing a select wavelength of energy from among said plurality of diffracted wavelengths of energy to said object surface to generate a corresponding reflected wavelength of energy:

(d) actuating a resonant mirror assembly associated with said diffraction grating to move said diffraction grating to sequentially direct said plurality of diffracted wavelengths of energy to said optical stop:

(e) actuating a sensor to determine each select diffracted wavelength of energy directed to said object surface;

(f) actuating a detector to detect said one or more of said reflected wavelengths, said detector being coupled to said sensor for associating said select diffracted wavelengths with said corresponding reflected wavelengths and (g) directing said one or more reflected wavelengths of energy from said object surface to said detector using said resonant mirror assembly.

11. The method of claim 10, wherein said spectral characteristics comprise one or more of reflectivity, transmissivity, or absorbability.

12. The method of claim 10, wherein:
said resonant mirror assembly includes a reflective surface and a back surface; and
said diffractive grating is affixed to said reflective surface.

13. The method of claim 10, further comprising the steps of:
providing a collimating lens spaced apart from said resonant mirror assembly and positioned to direct said plurality of wavelengths from said light source to said diffraction grating;
and
positioning said diffraction grating in spaced apart relationship from said resonant mirror assembly.

14. The method of claim 10 wherein said optical stop is a fixed optical stop.

15. The method of claim 10 wherein said optical stop is a moving optical stop.

16. The method of claim 10 wherein said resonant mirror assembly comprises a toroidal mirror having a pivot point and a drive assembly for moving said toroidal mirror about said pivot point.

* * * * *